United States Patent

[11] 3,530,752

[72] Inventors Kanichi Washio;
 Goro Fukugami; Tsuneo Aizawa, Tokyo, Japan
[21] Appl. No. 631,708
[22] Filed April 18, 1967
[45] Patented Sept. 29, 1970
[73] Assignee Kabushiki-Kaisha Amada,
 Tokyo, Japan,
 a company of Japan
[32] Priority March 14, 1967
[33] Japan
[31] 42/15,550

[54] GUIDING AND VIBRATION DAMPING DEVICE FOR A SAW BLADE IN A BAND-SAWING MACHINE
5 Claims, 8 Drawing Figs.
[52] U.S. Cl. .................................................. 83/201.15,
 143/160
[51] Int. Cl. .................................................. B26d 1/54
[50] Field of Search .................................. 83/201.15,
 168, 169, 647; 143/19, 158, 159, 160, 167;
 146/102.8; 143/163, 165

[56] References Cited
UNITED STATES PATENTS
| | | | |
|---|---|---|---|
| 3,456,539 | 7/1969 | Amada ........................ | 83/201.15 |
| 1,643,829 | 9/1927 | Biro ........................... | 146/102UX |
| 3,059,673 | 10/1962 | Woleslagle ................... | 143/159 |
| 3,104,575 | 9/1963 | Robinson ..................... | 83/169X |
| 3,352,186 | 11/1967 | Cleland ....................... | 83/201.15 |

Primary Examiner—W. Graydon Abercrombie
Assistant Examiner—Z. R. Bilinsky
Attorney—Cecily L. Frey ABSTRACT: This invention relates to a guiding and vibration damping device for a saw band in a band-sawing machine which has a supporting frame drivably fitted with a band-saw blade. The machine may be provided with a backup bar in contact with the back of said band-saw blade, to carry out a cutting operation by moving up and down and to the left, in the cutting direction. The device, which may be in contact with the back of said backup bar, is slidable in a direction perpendicular to the movement of the band-saw blade, and is pivotably fitted near one end to a portion of the supporting frame.

Inventors:
Kanichi Washio et al.

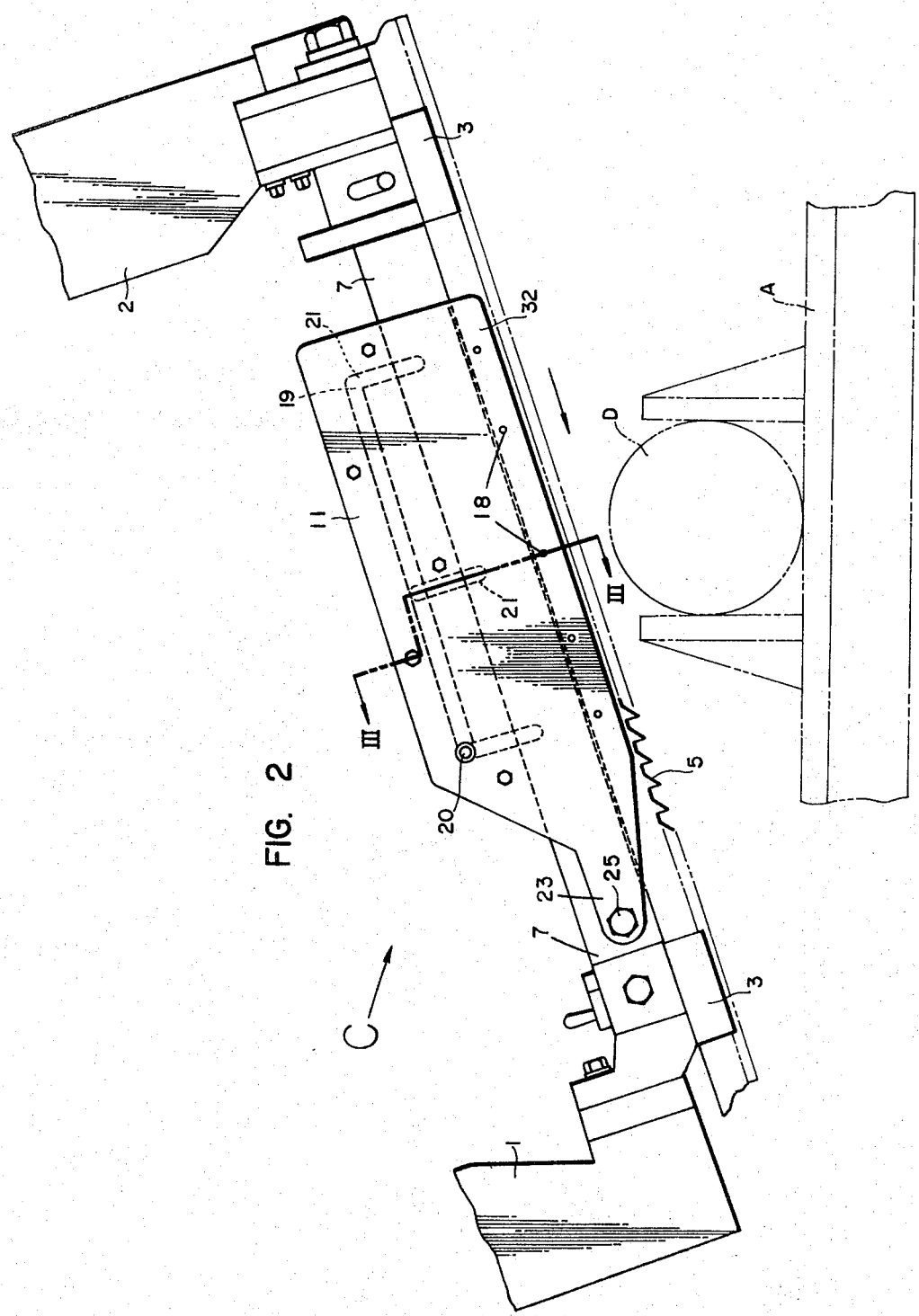

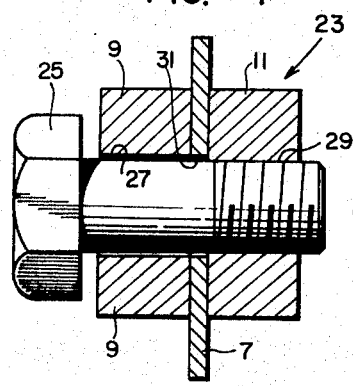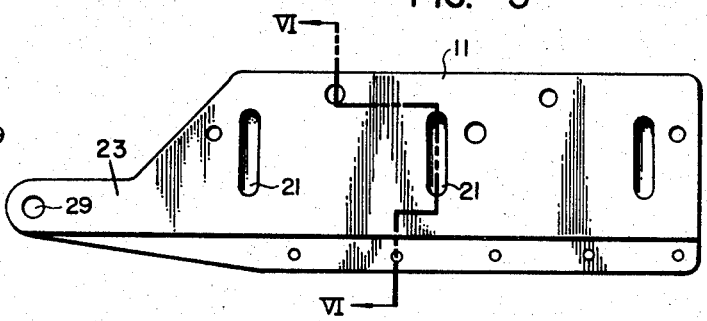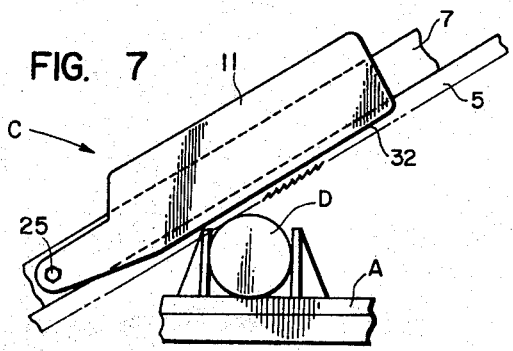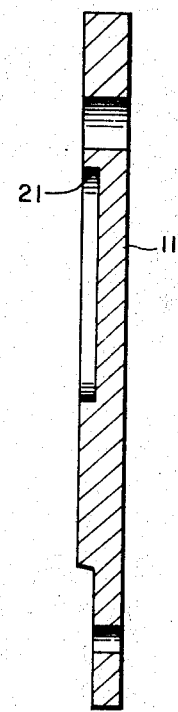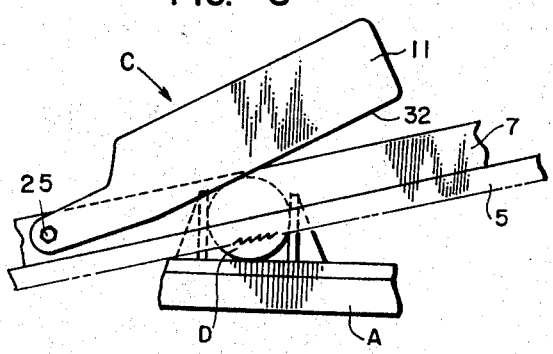

GUIDING AND VIBRATION DAMPING DEVICE FOR A SAW BLADE IN A BAND-SAWING MACHINE

In order to absorb vibrations of a saw blade in a band-sawing machine, a so-called backup bar is usually provided, in contact with the back of the saw blade, the latter being stretched on a supporting frame. However, with such devices, there have been defects that vibrations during the cutting operation, or specifically at the beginning of the operation, cannot be positively absorbed and that the saw blade will often disengage from the backup bar.

The present invention has the object of eliminating such defects.

An embodiment of the present invention shall be explained in detail with reference to the drawings in which:

FIG. 2 is a side elevation of the essential parts of FIG. 1, on an enlarged scale;

FIG. 4 is a detail view of a hinge part of the device of the present invention;

FIG. 5 is an elevation of a component part of the device;

FIG. 6 is a sectional view on line VI—VI in FIG. 5; and

FIG. 7 and 8 are views for explaining the operation of said device during the cutting operation.

Figure 1:
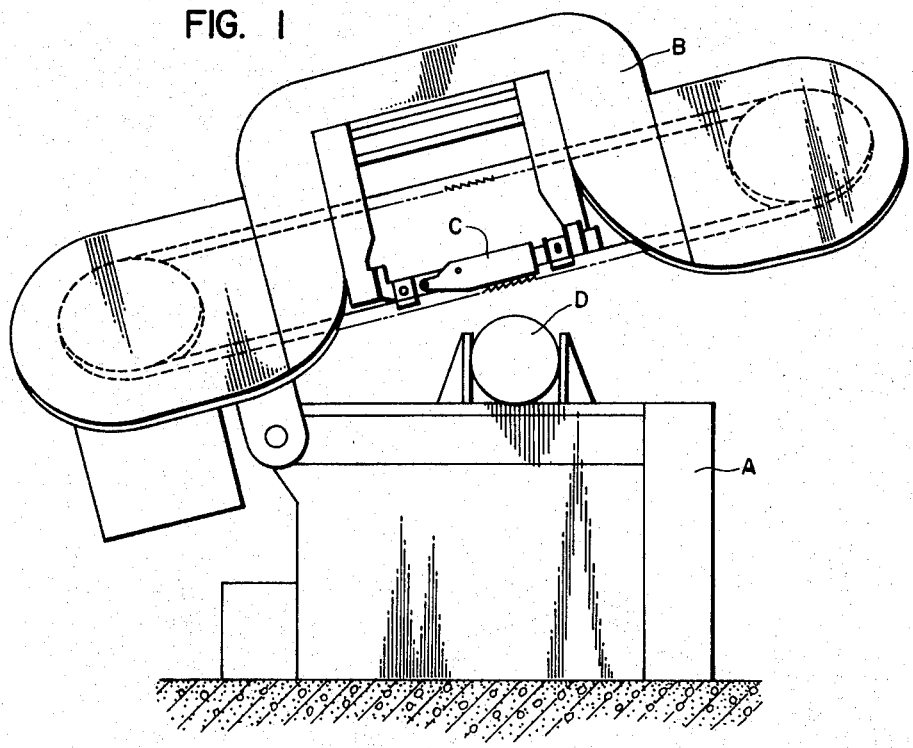
FIG. 1 is a side elevation of a horizontal band-sawing machine fitted with the guiding and damping device of the present invention.

FIG. 1 illustrates the guiding and damping device C of the present invention fitted to a frame B supporting a band-saw blade in the usual manner, to carry out a cutting operation on a material D to be cut as set on a base A. As in FIG. 2, a backup bar 7 in contact with the back of an endless band-saw blade 5 which is guided by band-saw guides 3, and runs in the direction indicated by the arrow, is fixed at the left end (as viewed in the drawing) to a left-hand frame body 1 on the pivoting side of the base A for the supporting frame B and is stretched at the other end to a right-hand frame body 2 as in a previously known construction (not illustrated) in detail.

Figure 3:
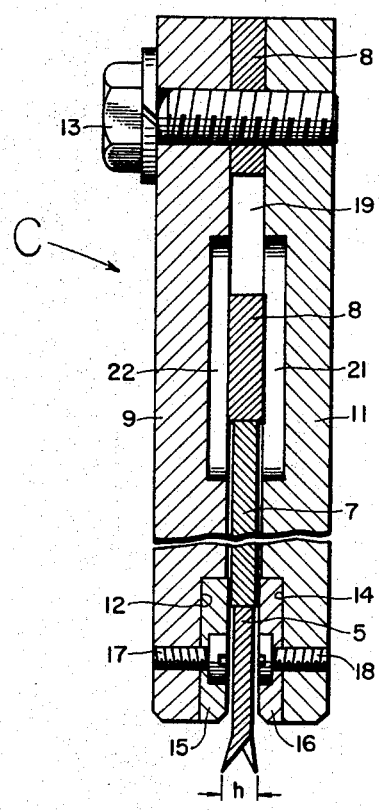
FIG. 3 is a sectional view on line III—III in FIG. 2.

Further, as clearly shown in FIG. 3, an engaging member or spacer 8 is held, with a pair of substantially rectangular guide brackets or members 9, 11 above the backup bar 7, and is fixed in place with a bolt 13 so as to keep the required clearance from the backup bar 7.

As is well known, the thickness of the backup bar 7 is made smaller than the width h of the tip of the band-saw blade 5, and wear-resistant metallic plates 15, 16 are screwed (at 17, 18) to stepped portions 12, 14 of guide brackets 9, 11, respectively. The plates 15, 16 are provided to keep the required clearance from both the band-saw blade 5 and the backup bar 7, and are set so that the weight of the device C may be borne by the back of the backup bar 7 against the lower edge of the spacer 8.

Numeral 19 denotes a longitudinal slot made in the spacer 8, and 21, 22 are transversed grooves made in the guide brackets 9, 11 so that cutting oil fed to the slot 19 through an oil feeding port 20 may be led to the band-saw blade 5 through the respective clearances formed between the backup bar 7 and the guide brackets 9, 11 by way of the grooves 21, 22.

Further, a hinge part 23 (FIG. 2) is provided on brackets 9, 11 near one end of the device C, a bolt 25 is rotatably fitted in holes 27 and 31 provided in the guide bracket 9 and the backup bar 7, respectively, and is fastened in a threaded portion 29 of the guide bracket 11, as shown in Fig. 4. A slight clearance is allowed between the head of the bolt and the outer surface of the guide bracket 9, and the device C is fitted so as to be pivotable with respect to the backup bar 7. It will be understood that the arrangement with the bolt 25 and the respective hole 27 and thread 29 may be as shown in FIG. 4 where the bolt is on the side of bracket 9; however, the parts may be reversed as to front and back, and then the bolt 25 would appear as in FIGS. 2, 7 and 8, that is, on the outside of bracket 11.

As the present invention is of such structure as is described above, at the beginning of the cutting operation of the band-sawing-machine, as illustrated in FIG. 7, the lower surface 32 of the device C will not be in contact with the material D to be cut, therefore the relative positions of the device C, the backup bar 7 and the band-saw blade 5 will be as initially fitted. There will be an effect that any vibration generated by the band-saw blade 5 will be positively absorbed not only by the backup 7 but also by the inside surfaces of the guide brackets 9, 11.

When the cutting operation proceeds until the material D to be cut comes into contact with the lower surface 32 of the device C as in FIG. 8, the device C will thereafter be stopped in that position while the band-saw blade 5 and the backup bar 7 further continue to be lowered and to cut the material.

However, when the band-saw blade 5 reaches a certain cutting depth in the material D, the vibrations generated in the band-saw blade 5 will so quickly reduce that the device C will be no longer required. When band-saw blade 5 finishes the cutting and the supporting frame B is moved upward, the device C will be lifted at the lower end of the spacer 8 by the back or top edge of the backup bar 7, so that it drops to the initial position, and will be again ready to begin a cutting operation.

As in the above, the present invention has the effect that the conventional defects can be eliminated by positively absorbing vibrations at the beginning of the cutting operation, and the band-saw blade is guided with the very simple device according to the invention. Also, oiling is made possible by utilizing the present device, if required.

Further, the device C need not always be hinged to the backup bar 7 as in the illustrated embodiment but may be hinged to any other part, for example, directly to such part of the supporting frame as, for example, the left-hand frame body 1 (this simple modification has not been illustrated).

Further, in a band-sawing machine provided with no backup bar, the device of the present invention may be pivoted at one end to such portion of the supporting frame as, for example, the left-hand frame body 1 so that the lower surface of the spacer 8 may be in direct contact with the back of the band-saw blade 5. It is needless to say that, in such case, the above-mentioned effects will not be impaired.

Any alterations and modifications of the concrete expression selected for the explanation herein should be all included in the present invention unless they deviate from the subject matter and scope of the present invention.

We claim:

1. A guiding and vibration damping device for an endless band-saw blade in a band-sawing machine, the latter including a supporting frame having a portion which drivably carries said band-saw blade, adapted to carry out a cutting operation by moving up and down as well as the left, said portion being movable in the cutting direction relative to the remaining portions of said frame to complete the cutting operation, and a back-up member fixed to said frame portion for slidably backing up said band-saw blade, the device comprising a pair of spaced-apart guide wall members defining a groove therebetween for slidingly guiding the sides of said band-saw blade as well as those of said back-up member, an engaging member disposed in said groove and riding on the back of said back-up member for damping the vibration of said band-saw blade as well as for allowing adjustment of the useful space of said groove, and means for pivotably attaching the device to said frame portion, with freedom of movement relative to said band-saw blade in a plane parallel to the cutting direction.

2. A guiding and vibration damping device for an endless band-saw blade in a band-sawing machine, the latter including a supporting frame drivably fitted with said band-saw blade, adapted to carry out a cutting operation by moving up and down as well as to the left, the device comprising a pair of spaced-apart guide members defining at least one groove therebetween, an engaging member disposed in said at least one groove, means for pivotably attaching the device to a portion of said supporting frame, portions of said guide members being in sliding engagement with the sides of said band-saw blade, and a backup bar forming part of said supporting frame and being interposed between said engaging member and the back of said band-saw blade, further portions of said guide members being in sliding engagement with the sides of said backup bar, wherein the device is pivotably attached to said backup bar by way of said attaching means.

3. The guiding and vibration damping device as defined in claim 2, further comprising oiling means for said band-saw blade, in operative connection with said at least one groove between said guide members.

4. The guiding and vibration damping device as defined in claim 2, wherein at least one pair of said portions of the guide members has a wear-resistant surface for respective engagement with said sides of the band-saw blade and of the backup bar.

5. A guiding and vibration damping device for an endless band-saw blade in a band-sawing machine, the latter including a supporting frame drivably fitted with said band-saw blade, adapted to carry out a cutting operation by moving up and down as well as to the left, the device comprising a pair of spaced-apart guide members defining at least one groove therebetween, an engaging member disposed in said at least one groove, means for pivotably attaching the device to a portion of said supporting frame, portions of said guide members being in sliding engagement with the sides of said band-saw blade, and a backup bar forming part of said supporting frame and being interposed between said engaging member and the back of said band-saw blade, further portions of said guide members being in sliding engagement with the sides of said backup bar, wherein said attaching means includes a threaded bore in a least one of said guide members and a bolt in releasable engagement with said bore, said bolt having a head portion slightly spaced apart from the other guide member so as to provide a clearance for said backup bar.